UNITED STATES PATENT OFFICE.

UBALDO CORBELLI AND ERCOLE ANTOLINI, OF ROME, ITALY.

METHOD FOR PRESERVATION OF SOLUTIONS OF TRICHLORID OF IODIN FOR PURIFYING CONTAMINATED WATER.

1,231,853.     Specification of Letters Patent.     Patented July 3, 1917.

No Drawing.     Application filed November 7, 1916. Serial No. 130,065.

*To all whom it may concern:*

Be it known that we, UBALDO CORBELLI, a subject of the King of Italy, doctor of chemistry, residing at Rome, Italy, and ERCOLE ANTOLINI, a subject of the King of Italy, residing at Rome, Italy, doctor of chemistry, have invented certain new and useful Improvements in Methods for Preservation of Solutions of Trichlorid of Iodin for Purifying Contaminated Water, of which the following is a specification.

Our present invention has for its object an industrial method for preserving solutions of trichlorid of iodin for purifying or rendering potable contaminated waters and it consists in: First cooling the concentrated solutions of trichlorid of iodin and submitting the same to a current of chlorin up to saturation or preferably for greater safety up to supersaturation always at low temperature.

Second, in distributing at once the liquid (always kept cool) in small tubes or vials to be immediately hermetically sealed so that the liquid will retain the excess of chlorin, as in such conditions the product will, on account of the excess of chlorin and of the pressure caused by it, always keep its stability and unalterability and serves to render water potable in a very short time (ten minutes) even if it is strongly contaminated provided it is clear.

The method may be modified in part of the details without departing from the gist of our invention.

Having now fully described our said invention and the manner in which the same is to be performed we declare that what we claim is:

A method for preserving solutions of trichlorid of iodin consisting in first saturating or preferably supersaturating with chlorin the concentrated solutions of tri-chlorid of iodin at a low temperature, and second in immediately putting the products in small tubes or vials, and hermetically sealing them at said low temperature, the whole substantially as described.

In witness, whereof we have hereunto set our signatures in the presence of two witnesses.

DR. UBALDO CORBELLI.
    ERCOLE ANTOLINI.

Witnesses:
    AMELSNI ORESTE,
    GIOVANNI BORTOLUZZI.